United States Patent
Comaniciu et al.

(10) Patent No.: US 7,764,736 B2
(45) Date of Patent: Jul. 27, 2010

(54) REAL-TIME VIDEO OBJECT GENERATION FOR SMART CAMERAS

(75) Inventors: Dorin Comaniciu, Princeton, NJ (US);
Alessio Del Bue, Albissola Mare (IT);
Visvanathan Ramesh, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 661 days.

(21) Appl. No.: 11/545,153

(22) Filed: Oct. 10, 2006

(65) Prior Publication Data
US 2007/0030896 A1    Feb. 8, 2007

Related U.S. Application Data

(63) Continuation of application No. 10/325,413, filed on Dec. 20, 2002, now Pat. No. 7,167,519.

(60) Provisional application No. 60/342,945, filed on Dec. 20, 2001.

(51) Int. Cl.
*H04N 7/12* (2006.01)
*G06K 9/34* (2006.01)
(52) U.S. Cl. .................. 375/240.08; 382/171
(58) Field of Classification Search ........... 375/240.08, 375/240.09, 240.24; 382/173, 236, 251, 382/171, 177
See application file for complete search history.

(56) References Cited

U.S. PATENT DOCUMENTS

| | | | | |
|---|---|---|---|---|
| 5,764,803 A * | 6/1998 | Jacquin et al. | | 382/236 |
| 6,256,423 B1 * | 7/2001 | Krishnamurthy et al. | | 382/251 |
| 6,363,160 B1 * | 3/2002 | Bradski et al. | | 382/103 |
| 6,661,918 B1 * | 12/2003 | Gordon et al. | | 382/173 |
| 6,751,350 B2 * | 6/2004 | Crinon et al. | | 382/173 |

\* cited by examiner

*Primary Examiner*—Gims S Philippe
(74) *Attorney, Agent, or Firm*—Donald B. Paschburg

(57) ABSTRACT

An apparatus and method for video object generation and selective encoding is provided. The apparatus includes a detection module for detecting a first object in at least one image frame of a series of image frames; a tracking module for tracking the first object in successive image frames and segmenting the first object from a background, the background being a second object; and an encoder for encoding the first and second objects to be transmitted to a receiver, wherein the first object is compressed at a high compression rate and the second object is compressed at a low compression rate. The receiver merges the first and second object to form a composite image frame. The method provides for detecting, tracking and segmenting one or more objects, such as a face, from a background to be encoded at the same or different compression rates to conserve bandwidth.

29 Claims, 7 Drawing Sheets

REAL-TIME VIDEO OBJECT GENERATION FOR SMART CAMERAS

STATEMENT OF RELATED CASES

This application is a continuation of U.S. patent application Ser. No. 10/325,413, filed Dec. 20, 2002, now U.S. Pat. No. 7,167,519 which claims priority to an application entitled "REAL-TIME MPEG-4 ENCODING FOR SMART CAMERAS" filed in the United States Patent and Trademark Office on Dec. 20, 2001 and assigned Ser. No. 60/342,945, all of which are hereby incorporated by reference.

BACKGROUND OF THE INVENTION

1. Field of the Invention

The present invention relates generally to image processing, and more particularly, to an apparatus, system and method for real-time video object generation and selective encoding for smart cameras.

2. Description of the Related Art

3 G digital cellular technology will soon provide increased bandwidth: up to 384K bit/sec when a device is stationary or moving at pedestrian speed, 128K bit/sec in a car, and 2 M bit/sec in fixed applications. By combining this new communication framework with powerful vision algorithms, better sensors, and DSP (digital signal processing) chips with increased computational power and memory capacity, the concept of smart cameras becomes a reality.

A smart camera is an autonomous vision-based device capable of performing intelligent tasks such as surveillance or obstacle detection while reporting to its base station events and data. A network of such intelligent sensors can achieve complex video surveillance, traffic control, or real-time analysis of various medical image modalities.

SUMMARY OF THE INVENTION

A system and method for video object generation and selective encoding with applications in surveillance and mobile videophones is provided. In accordance with the present invention, human face detection, tracking, and compression are performed in real-time. The system and method belongs to a new generation of intelligent vision sensors called smart cameras, which execute autonomous vision tasks and report events and data to a remote base-station. A detection module signals a human presence within a camera field of view, while a tracking part follows the target, e.g., the human presence, to generate video objects representing faces and a background. A compression module is MPEG-4 compliant and implements the Simple Profile of the MPEG-4 standard, capable of encoding up to four video objects. At the same time, the compression is selective, maintaining a higher quality for the video objects representing faces and a lower quality for the background representation. This selective compression contributes to a bandwidth reduction while preserving face information for the purpose of recognition/re-identification.

According to an aspect of the present invention, an apparatus for video object generation and selective encoding is provided. The apparatus includes a detection module for detecting a first object in at least one image frame of a series of image frames; a tracking module for tracking the first object in successive image frames of the series of image frames and segmenting the first object from a background, the background being a second object; and an encoder for encoding the first and second objects to be transmitted to a receiver, wherein the first object is compressed at a high compression rate and the second object is compressed at a low compression rate.

The apparatus further includes a camera for acquiring the series of image frames, a frame grabber for grabbing image frames from the camera and outputting the image frames to the detection module and tracking module, a camera control module for controlling a position of the camera to ensure the first object is centered in an image frame and a modeling module for modeling the first object by computing a statistical characterization of the first object. Furthermore, the receiver merges the first and second object to form a composite image frame.

According to another aspect of the present invention, the detection module detects the first object by performing multiple initializations on the at least one image frame, for each initialization computes a degree of similarity between a model and a candidate object in the at least one image frame, and applies an iterative comparative procedure to the degrees of similarity computed, the iterations being based on a gradient vector to shift the location of candidate object in the at least one frame, to derive as the location of the candidate object in the at least one frame that location which has characteristics most similar to the characteristics of the model. The detection module causes the iterations to be repeated until the shift in locations is less than a given first threshold and optionally uses a mean shift iteration to compute the gradient vector along which the location of the candidate object is shifted.

According to a further aspect of the present invention, the tracking module computes a degree of similarity between the detected object and a candidate object in a successive frame, and applies an iterative comparative procedure to the degrees of similarity computed, the iterations being based on a gradient vector to shift the location of candidate object in the successive frame, to derive as the location of the candidate object in the successive frame that location which has characteristics most similar to the characteristics of the detected object in the initial frame. The tracking module causes the iterations to be repeated until the shift in locations is less than a given second threshold. The degree of similarity is expressed by a metric derived from the Bhattacharyya coefficient.

According to a further aspect of the present invention, a method for video object generation and selective encoding includes the steps of detecting a first object from at least one of a plurality of successive image frames; tracking the first object through the plurality of image frames; segmenting the first object from a background of the image frame, the background being a second object; and encoding the first and second objects to be transmitted to a receiver, wherein the first object is compressed at a high compression rate and the second object is compressed at a low compression rate. The method further includes the steps of acquiring the plurality of successive image frames by a camera and controlling a position of the camera to ensure the first detected object is centered in an image frame.

In a still further aspect of the present invention, the method includes the step of modeling the first object by computing a statistical characterization of the first object. Additionally, the method includes the steps of receiving the first compressed object and the second compressed object and decoding the first and second object to form a composite image frame.

In another aspect of the present invention, the detecting step further includes performing multiple initializations on the at least one image frame; for each initialization, computing a degree of similarity between a model and a candidate object in the at least one image frame; and applying an iterative comparative procedure to the degrees of similarity computed, the iterations being based on a gradient vector to shift the location of candidate object in the at least one frame, to derive as the location of the candidate object in the at least one frame that location which has characteristics most similar to the characteristics of the model. The iterations are repeated until the shift in locations is less than a given first threshold. Optionally, the detection step uses a mean shift iteration to compute the gradient vector along which the location of the candidate object is shifted.

In yet another aspect of the present invention, the tracking step further includes computing a degree of similarity between the detected object and a candidate object in a successive frame; and applying an iterative comparative procedure to the degrees of similarity computed, the iterations being based on a gradient vector to shift the location of candidate object in the successive frame, to derive as the location of the candidate object in the successive frame that location which has characteristics most similar to the characteristics of the detected object in the initial frame. The iterations are repeated until the shift in locations is less than a given second threshold. The degree of similarity is expressed by a metric derived from the Bhattacharyya coefficient.

In another aspect, the segmenting step includes applying a segmentation mask to the first object defining an area to be segmented, wherein the segmentation mask is of a shape resembling the first object.

In a further aspect of the present invention, the tracking, segmenting and encoding steps are continuously repeated only for the first object.

According to another aspect of the present invention, a method for video object generation and selective encoding includes the steps of detecting a plurality of objects from at least one of a plurality of successive image frames; tracking the plurality of objects through the plurality of image frames; segmenting the plurality of objects from the at least one image frame; and encoding the plurality of objects to be transmitted to a receiver, wherein each of the plurality of objects is compressed at a different compression rate. The method further includes the steps of receiving the plurality of compressed objects and decoding the plurality of compressed objects to form a composite image frame.

The method further includes the step of modeling the plurality of objects by computing a statistical characterization of each of the plurality of objects.

According to a further aspect, the detecting step further includes performing multiple initializations on the at least one image frame; for each initialization, computing a degree of similarity between a plurality of models and candidate objects in the at least one frame; and applying an iterative comparative procedure to the degrees of similarity computed, the iterations being based on a gradient vector to shift the location of candidate objects in the at least one frame, to derive as the location of the candidate objects in the at least one frame as points which have characteristics most similar to the characteristics of the plurality of models, wherein the iterations are repeated until the shift in locations is less than a given first threshold. Furthermore, the detection step uses a mean shift iteration to compute the gradient vector along which the location of the candidate objects is shifted.

In another aspect of the present invention, the tracking step further includes computing a degree of similarity between the detected objects and candidate objects in a successive frame; and applying an iterative comparative procedure to the degrees of similarity computed, the iterations being based on a gradient vector to shift the location of candidate objects in the successive frame, to derive as the location of the candidate objects in the successive frame that location which has characteristics most similar to the characteristics of the detected objects in the initial frame, wherein the iterations are repeated until the shift in locations is less than a given second threshold. The degree of similarity is expressed by a metric derived from the Bhattacharyya coefficient.

BRIEF DESCRIPTION OF THE DRAWINGS

The above and other aspects, features, and advantages of the present invention will become more apparent in light of the following detailed description when taken in conjunction with the accompanying drawings in which:

FIG. 5 shows six image frames taken from a video sequence where the camera is fixed;

FIG. 6 shows reconstructed face data for the six frames shown in FIG. 5;

FIG. 7 shows reconstructed background data for the six frames shown in FIG. 5;

DETAILED DESCRIPTION OF PREFERRED EMBODIMENTS

Preferred embodiments of the present invention will be described hereinbelow with reference to the accompanying drawings. In the following description, well-known functions or constructions are not described in detail to avoid obscuring the invention in unnecessary detail.

The present invention presents a real-time apparatus, system and method for generating video objects of interest and encoding the objects selectively. The present invention represents a step forward towards the implementation of smart cameras for surveillance and mobile videophones. According to an embodiment of the present invention, the system and method detect a human presence, e.g. a first object, in the field of view of a camera, tracks and segments the human presence from a background, e.g., a second object, and transmits to a receiver, e.g., a base station or mobile terminal, high quality face data compressed at a high bit rate while trading-off the quality of background data which is compressed at a low bit rate.

Figure 1:
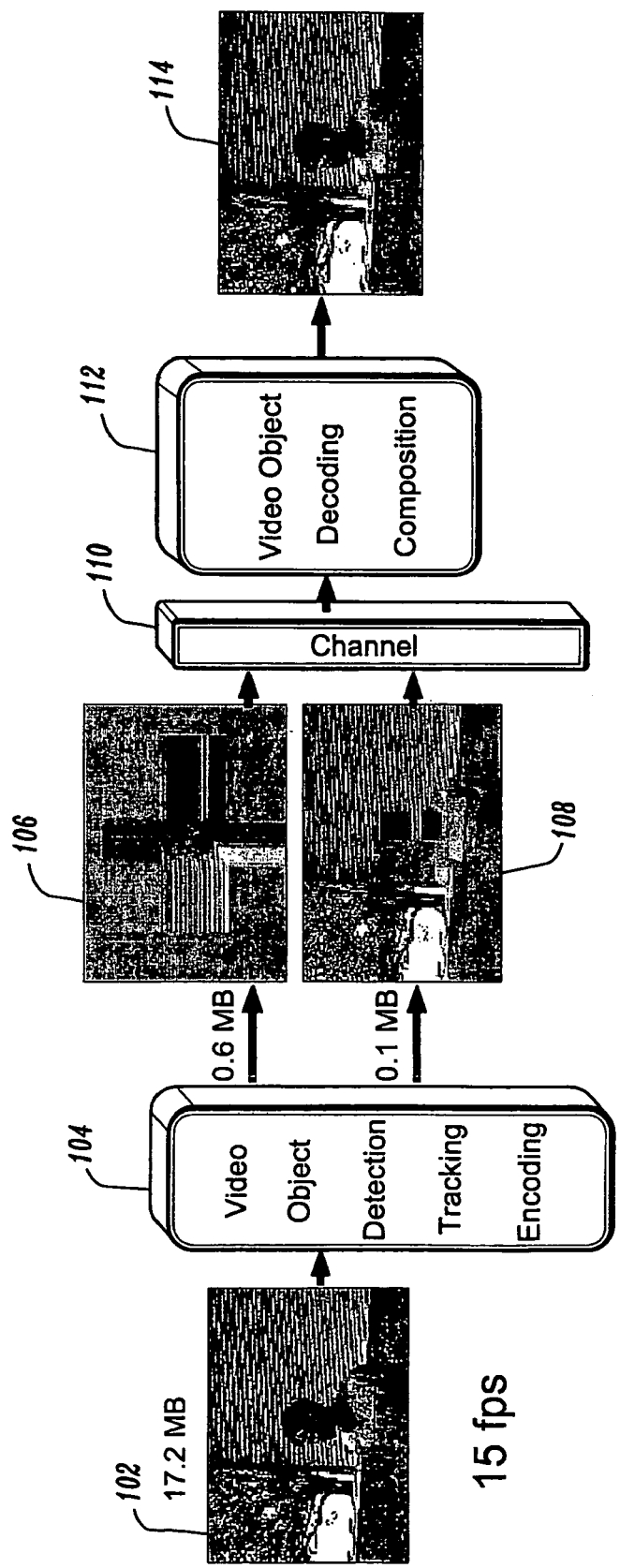
FIG. 1 is a general flow diagram for real-time video object generation and selective encoding according to embodiment of the present invention.
Figure 2:
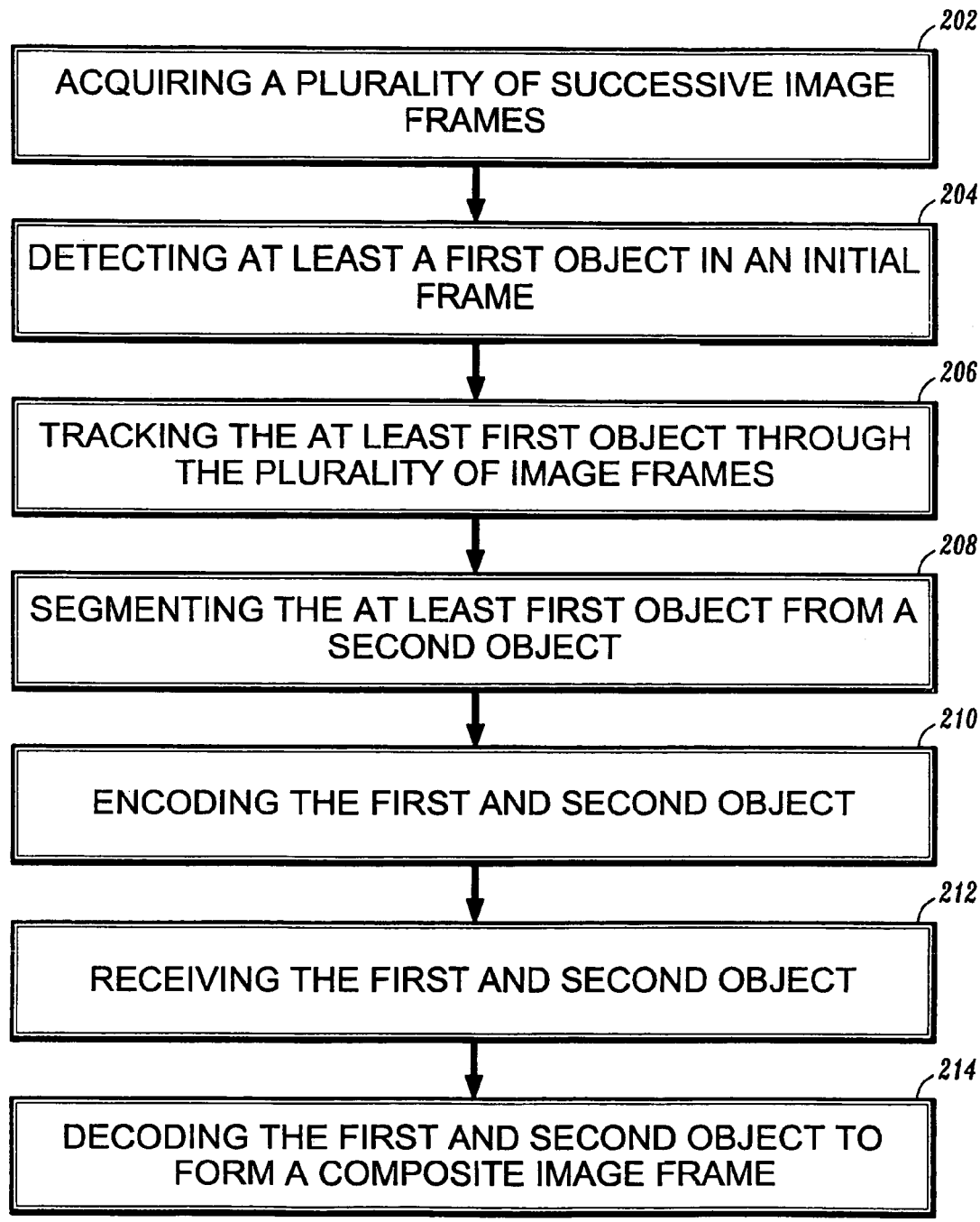
FIG. 2 is a flowchart illustrating a method of generating video objects and selective encoding of the objects in accordance with the present invention.

Referring to FIGS. 1 and 2, a general flow diagram of the present invention is illustrated in FIG. 1 and a method of generating video object and selective encoding of the objects is presented in FIG. 2.

Initially, a series of successive image frames of video 102 is acquired (step 202) via a device, e.g., a transmitter, active camera, etc. For example, the initial video sequence 102 may be acquired at 15 fps (frames per second) and equaling 17.2 MB in size. The video sequence 102 is then processed for object detection, tracking and encoding 104 to reduce the size of the video and conserve bandwidth.

First, in step 204, an object 106, such as a face, is detected based on a model of a human face. The model may be constructed by computing a statistical characterization of the object, e.g., by computing a histogram or density estimate. Once the face has been detected, it can be tracked through the video sequence, or series of successive image frames, by a tracking algorithm which will be described below (step 206). The tracked object will be segmented from the background 108, or second object, (step 208) so each object can be encoded or compressed at different rates depending the desired quality of each object (step 210). For example, after the detection, tracking and encoding steps are performed, the first object 106, e.g., the face, is to be transmitted in a file size of 0.6 MB and the second object 108, e.g., the background, is transmitted at 0.1 MB. The face is transmitted at a larger size because it is to be compressed at a much higher quality than the background.

The first and second objects are then transmitted through any suitable transmission channel 110, such as phone lines, the Internet, a wireless communication channel, etc. Upon being received by a receiver 112, e.g., a base station, mobile terminal, etc, (step 212), the first and second object will be decoded to form composite image frames 114 (step 214). The reconstructed image frames 114 will include high quality face images, e.g., the first object, and lower quality background images, e.g., the second object, that are transmitted at a significantly lower bandwidth than the originally acquired video 102.

It is to be appreciated that the first and second objects may be stored separately when received by a receiver or may be stored as composite video after decoding by the receiver. Additionally, it is to be understood that multiple objects, e.g., several people, may be detected and tracked and encoded at different compression rates in accordance with the present invention.

In the following detailed description, Section 1 presents on overview of an exemplary system in accordance with an embodiment of the present invention and details its use for in surveillance and mobile videophone applications. Section 2 describes a face detection and tracking module and method, while a compression module and method are presented in Section 3. Section 4 presents experimental results.

1 System Overview

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), a read only memory (ROM) and input/output (I/O) interface(s) such as keyboard, cursor control device (e.g., a mouse) and display device. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Next, the functional modules of the system will be described together with two application scenarios: video surveillance and mobile videophone.

1.1 Block Diagram

Figure 3:
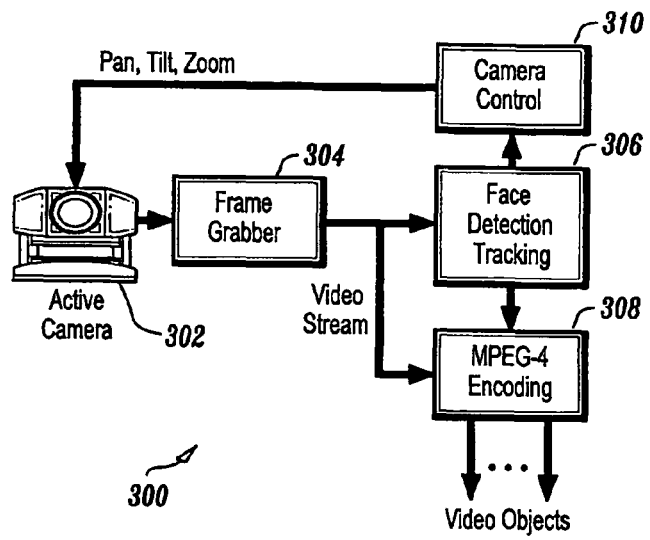
FIG. 3 is a block diagram of an exemplary system in accordance with the present invention.

A block diagram of the system is given in FIG. 3. Referring to FIG. 3, the system 300 generally includes a camera 302 for capturing a video sequence, the video sequence including a series of frames, and a frame grabber 304 for grabbing frames from the series of frames and outputting the frames to a detection module 306. The detection module 306 detects a first object which is subsequently tracked by tracking portion. The first object is segmented from the background as a second object and the first and second objects are then encoded for transmission by encoder 308.

The detection and tracking module 106 signals a human presence, e.g., the first object, within the camera field of view and provides 2-D coordinates of the detected faces within the image frame and estimated scales of the detected face to the compression module 108. Based on the face and background data, the compression module 108 generates MPEG-4 compliant compressed video objects. The software implementation of the method of the present invention is modular, involving multiple threads that are synchronized for the tasks of grabbing, detection, tracking, camera control, compression, and visualization.

When active cameras 102 are used, a camera control module 110 initiates commands that ensure the centering of the face, or first object, in the camera view. Appropriate control of the pan, tilt, and zoom is an important phase of the tracking process. The camera will execute fast saccades in response to sudden and large movements of the target while providing a smooth pursuit when the target is quasi-stationary. The system 300 implements a control mechanism that resembles the human visual system. For example, for the exemplary system, the fovea sub-image occupies laterally about 6 degrees of the camera's 50 degrees field of view, at zero zoom.

However, contrary to other tracking systems that suspend the processing of visual information during the saccade movements, the visual face tracker of the present invention is sufficiently robust to deal with the large amount of blurring resulting from camera motion. As a result, the visual tracking is a continuous process, which is not interrupted by servo commands initiated by the camera control module.

1.2 Surveillance Scenario

In the surveillance scenario, the system 300 detects a human presence within an observation area only if a face is present in the camera field of view. With this respect, the system does not perform change or motion detection, it focuses on face detection and communication of objects that enter an observation area.

In one embodiment, the system will integrate a mosaic representation of the background. A background mosaic is constructed from multiple images of a scene that are obtained through pan and tilt camera movements and updated at regular intervals. The images are grabbed frame by frame together with their pan and tilt parameters, projected to a viewing sphere, and blended to form the mosaic. Given the background mosaic and the registered current image, significant changes in the scene can be detected, which will increase the detection and tracking robustness. In this embodiment, the background mosaic is transmitted only once. Subsequent transmissions involve encoded objects (e.g. faces, pedestrians, or cars) and illumination update parameters, which are used to perform mosaic adaptation. Therefore, since only the detected object will be subsequently sent, the detected object will be sent at a reduced bandwidth.

1.3 Mobile Videophone Scenario

A basic scenario of video and audio communications between mobile/hand-held devices over point-to-point links reveals many technological issues that require intelligent video processing. For two remote users, there are two types of signals that need to be transmitted: video and voice. While the quality of the voice signal is not critically dependent on the direction of arrival, the video data captured by the camera installed on the communication device must contain the talking head (and shoulders) of the user. This constraint can be achieved in two ways.

One solution is to constraint the movement of the user to the camera field of view. Nevertheless, this solution is unpractical since the restriction on the user-camera relative movement is cumbersome for a hand-held device. A different solution would be to use a camera with a large field of view. In this case, the user can move freely, but the ratio between the talking head and the entire captured frame becomes too low. This implies inefficient encoding of the information of interest, therefore, waste of bandwidth.

The above problems can be solved if the camera has sufficient intelligence to know where the user face is located in the current frame by using the technique of the present invention. Various solutions for the reduction of the bandwidth can then be formulated using MPEG-4 compliant compression. The transmitting device can send only the "talking head" or only the "head and shoulders" information, thus using the bandwidth efficiently. In another scenario, a selective compression scheme would allocate more bits for the video object representing the human face, and fewer bits for the background. In a more advanced configuration, by employing the relative position of the detected face, a pan, tilt, and zoom camera installed on the device can be controlled.

2 Face Detection and Tracking

The modules performing the detection and tracking of objects of interest, e.g., human faces, will now be described below.

2.1 Modeling and Optimization Framework

The modeling and optimization framework employed by the present invention is disclosed in U.S. patent application Ser. No. 09/503,911 entitled "REAL-TIME TRACKING OF NON-RIGID OBJECTS USING MEAN SHIFT" filed on Feb. 14, 2000 by D. Comaniciu et al. and assigned to the common assignee of the application hereto, the contents of which are hereby incorporated by reference in its entirety.

A color model of the human face is obtained by computing a statistical characterization, e.g., a mean histogram, of a plurality of face samples recorded in the morning, afternoon, and at night. To represent the mean histogram, the intensity normalized RG (i.e., red and green color of RGB) space with 128×128 bins is employed. A dissimilarity between the face model and possible face candidates in the image frame is measured by a metric based on the Bhattacharyya coefficient, as is known in the art. The problem of face localization is then expressed as a metric minimization, or equivalently as the maximization of the Bhattacharyya coefficient between two color distributions. By including spatial information into the color histograms, it can be show that the maximization of the Bhattacharyya coefficient is equivalent to maximizing a density estimate. As a consequence, a gradient ascent mean shift procedure can be employed to guide a fast search for the best face candidate in the neighborhood of a given image location.

The optimization from above achieves convergence in only a few iterations and is well suited for the task of real-time detection and tracking. To adapt to the scale changes of the target, the scale invariance property of the Bhattacharyya coefficient is exploited as well as the gradient information on the border of the hypothesized face region.

2.2 Detection

Figure 4A:
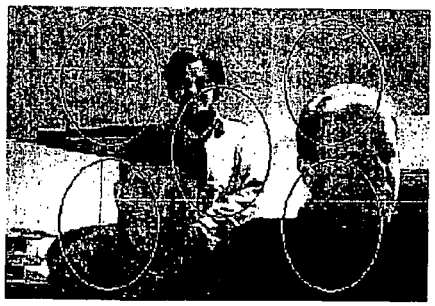
FIG. 4*a* is a view showing an image frame including three faces and five initialization ellipses and FIG. 4*b* is a chart illustrating values of the Bhattacharyya coefficient calculated for FIG. 4*a*.
Figure 4B:
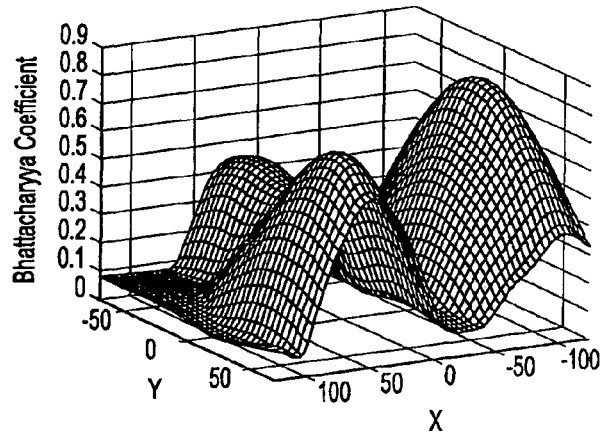

The detection is defined as a mean shift optimization with multiple initializations, each in a different location of the current image frame. When the system settings involve 320×240 pixel images with subjects at a distance between 30 cm to 3 m from the camera, five initial regions of elliptical shape with semi-axes equal to 37 and 51 are used, as shown in FIG. 4a. This arrangement guarantees that at least one initial ellipse is in the basin of attraction of a face of typical size. The detection module detects the first object by performing multiple initializations on an initial image frame and, for each initialization, computes a degree of similarity between the model and a candidate object in the initial frame. The degree of similarity being expressed by a metric derived from the Bhattacharyya coeffient. The detection module then applies an iterative comparative procedure to the degrees of similarity computed, the iterations being based on a gradient vector to shift the location of candidate object in the initial frame, to derive as the location of the candidate object that location which has characteristics most similar to the characteristics of the model. The iterations are repeated until the shift in locations is less than a given threshold. Furthermore, the detection module uses a mean shift iteration to compute the gradient vector along which the location of the candidate object is shifted. FIG. 4b presents the surface derived by computing the Bhattacharyya coefficient for the entire image from FIG. 4a; the greater Bhattacharyya coefficient, the more similar an object is to the model learned. As shown in FIG. 4b, three peaks are derived each peak representing a face detected in FIG. 4a.

2.3 Tracking

The tracking process involves optimizations in the neighborhood of the previous face location estimate, and is sufficiently fast to run at frame rate while requiring only a fraction of the computational power of a standard PC.

Once the object is detected, a degree of similarity between the detected object and a candidate object in a successive frame is computed, the degree being expressed by a metric derived from the Bhattacharyya coefficient. An iterative comparative procedure is applied to the degrees of similarity computed, the iterations being based on a gradient vector corresponding to a maximization of the Bhattacharyya coefficient to shift the location of candidate object in the successive frame, to derive as the location of the candidate object in the successive frame that location which has characteristics most similar to the characteristics of the object in the initial frame. The iterations are repeated until the shift in locations is less than a given threshold. As a result, the observed face is characterized for each frame by two vectors representing its estimated position and scale.

3 Encoding Module

The encoding or compression module may be based on the software recently made public by the International Organization for Standardization (IOS 2001) as the MPEG-4 standard. A conventional Simple Profile encoder, in accordance with the MPEG-4 standard, capable of processing up to four video objects of rectangular shape is employed. Therefore, a rectangular segmentation mask is applied to the detected and tracked object to segment the object from the background. The reference software implements motion estimation with full search (16×16 pixels) block-matching algorithm with forward prediction.

It is to be understood that only four objects can be detected, tracked and segmented according the MPEG-4 standard. However, the present invention is in no way limited to only four objects but is subject to four object only in an embodiment employing the MPEG-4 standard.

4 Experiments

The performance of the system is assessed in this section by analyzing experiments that involve both static and moving cameras.

4.1 Static Camera with Automatic Pan and Tilt

The first experiment was performed in an office environment with daylight (coming from a large window in the background) and artificial light, while a human subject walks through the office and executes large and sudden movements. Six frames from an original sequence of about 300 frames are shown in FIG. 5. Only two QCIF (Quarter Common Intermediate Format) video objects are created in this experiment, the face and background.

The detection, tracking, video object formation, and selective encoding are performed at a frame rate of 15 fps. Since the decoder of the receiver merges together the video objects according to the segmentation mask, the reconstructed stream is a composition of a high quality video object (the face) and of a low quality video object (the background). A texture quantization step of 4 is used for the face and 30 for the background. Also, in the system setup, only forward prediction is imposed, which insures a faster solution but trades-off compression performance.

FIG. 6 illustrates the reconstructed face data for the same frames shown in FIG. 5. The reconstructed background data is presented in FIG. 7. A subjective estimation of the results can be obtained by just examining the reconstructed frames. The face data is decoded with much higher accuracy in comparison to the background data.

As an objective dissimilarity measure, the Peak Signal to Noise Ratio (PSNR) between the original and reconstructed frames is employed:

$$PSNR = 20 \log_{10}(255/RMSE) \quad (1)$$

where RMSE denotes the Root Mean Squared Error, expressed by:

$$RMSE = \sqrt{\frac{1}{n}\sum_{i=1}^{n}(X_i - X_i^R)^2} \quad (2)$$

In equation (2) the original image values at the position i are denoted by $X_i$, while $X_i^R$ are the values of the decoded image and n is the number of pixels. Note that for color images the formula (2) is applied for each color plane.

Figure 8A:
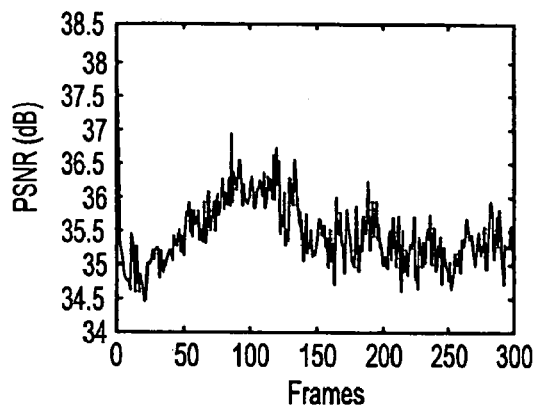
FIG. 8*a* is a chart illustrating the Peak Signal to Noise Ratio (PSNR) for the reconstructed face data shown in FIG. 6.
Figure 8B:
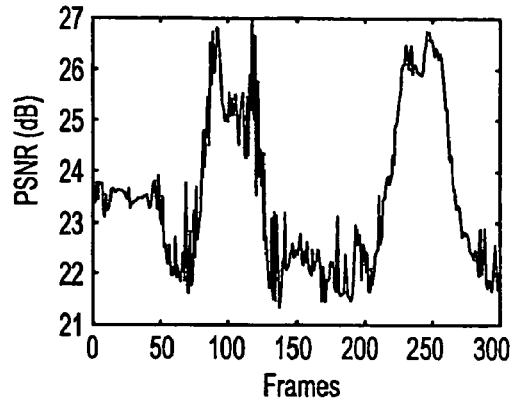
FIG. 8*b* is a chart illustrating the Peak Signal to Noise Ratio (PSNR) for the reconstructed background data shown in FIG. 7.

The PSNR values for each reconstructed frame are shown in FIG. 8a for the face video object and in FIG. 8b for the background. For the background object, the PSNR varies significantly in time, about 6 dB. The reason of the variation is due to both changes in the scene composition (regions with and without texture) and to camera motion. On the other hand, the quality of the reconstructed face is remarkably constant over time.

Figure 9:
FIG. 9 shows six composite frames constructed from the two reconstructed video objects.
Figure 9:
Figure 9:
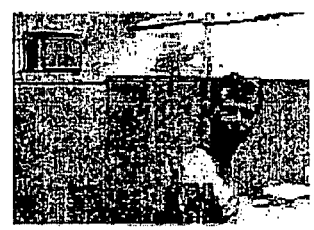
Figure 9:
Figure 9:
Figure 9:
Figure 10:
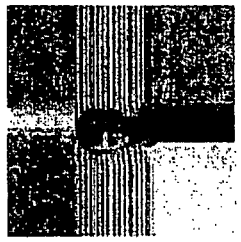
FIG. 10 illustrates a face video object with padding information.

Six frames containing the composition of the two reconstructed video objects are shown in FIG. 9. Again, observe the preservation of the face details in comparison to the background. The original output of the decoder has been modified to eliminate padding information around the segmentation mask, for a better delineation at the border of the video objects. An image with the padding information is shown in FIG. 10, where pixel information is extended to the limit of the background object.

Figure 11B:
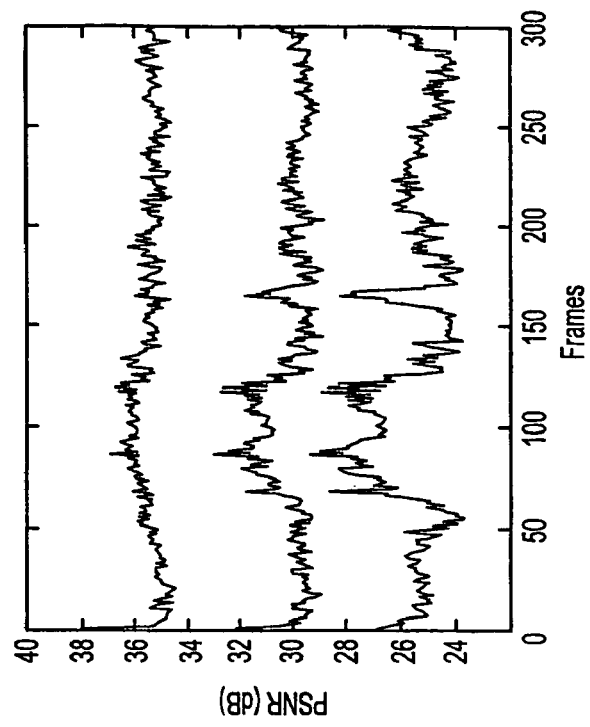
FIG. 11*b* is a chart illustrating the PSNR computed only for the face object as a function of frame number.
Figure 11A:
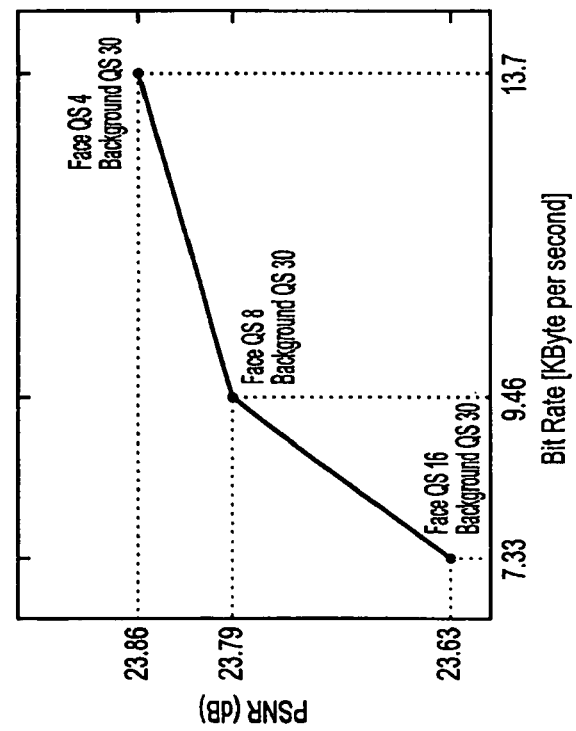
FIG. 11*a* is a chart illustrating the PSNR of various quantization steps as a function of the bit rate.
Figure 12B:
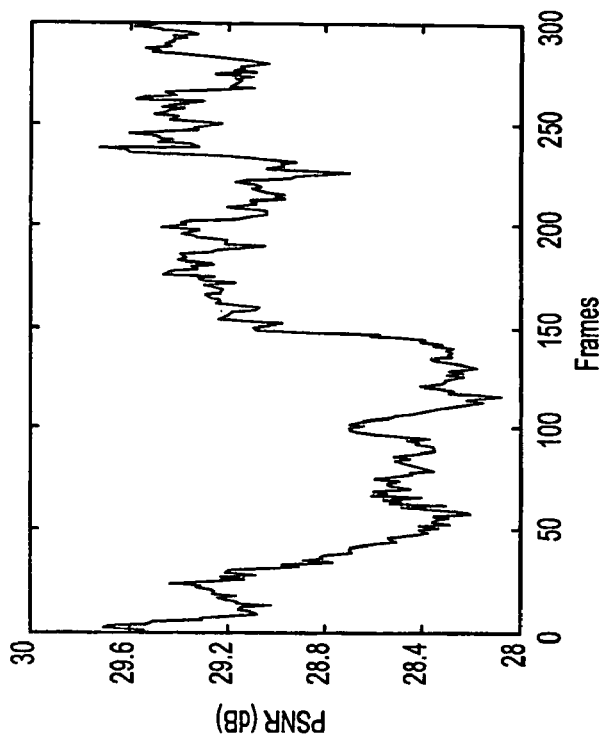
FIG. 12*b* is a chart illustrating the PSNR for reconstructed background data according to a moving camera experiment employing the techniques of the present invention.

The bit rate at the output of the encoder for various quantization steps (4, 8, and 16, respectively) applied to the face object is represented in FIG. 11a, with the quantization step for the background maintained unchanged, equal to 30. The corresponding compression ratio is 63.06, 91.32, and 117.9, respectively. FIG. 11b shows the resulting PSNR computed only for the face object.

4.2 Moving Camera 4.2.1 Vehicle Pursuit Sequence

An original gray level sequence containing about 300 frames taken in a moving vehicle were obtained. A box-shaped segmentation mask enclosed the car from the front. As a result, two video objects are generated, the frontal car and the background. The sequence has a frame size of 256×256 pixels and lasts for approximately 20 seconds, achieving a frame rate of 15 frames per second.

Figure 12A:
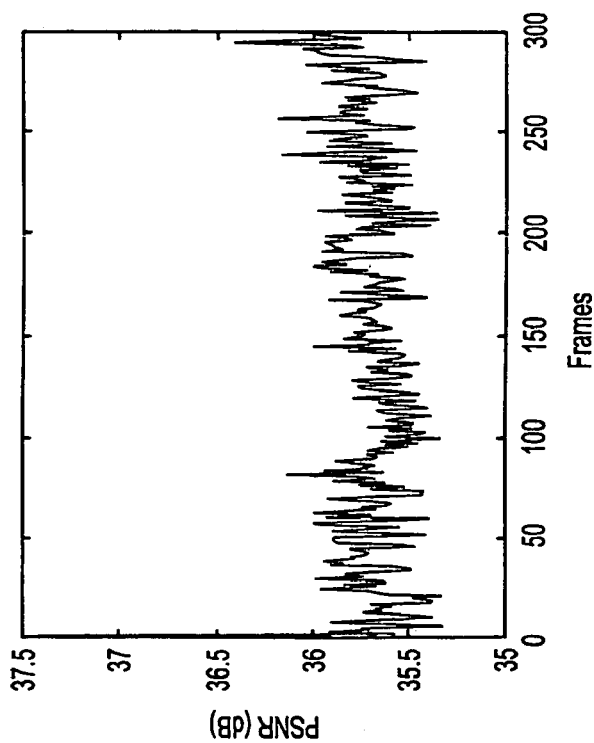
FIG. 12*a* is a chart illustrating the PSNR for reconstructed car data according to a moving camera experiment employing the techniques of the present invention.

The PSNR values of the car video object shown in FIG. 12a present an impressive regularity. The reason is that the segmentation mask encloses almost exactly the car object, which is generally square as viewed from behind the car. Hence, the movements of and changes in the background structure of the camera do not affect the compression quality of the car video object.

Figure 13B:
FIG. 13 illustrates the relationship between the shape of a segmentation mask and shape of an object of interest.
Figure 13A:
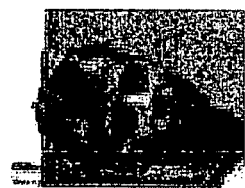

By comparison, in the face encoding example described above, a rectangular mask was employed to enclose the elliptical shape of the face object (see FIG. 13). As shown in FIG. 13a, a square segmentation mask employed with a face captures a large amount of the background image compared to FIG. 13b where the square segmentation mask approximates the shape of the car. As a result of this approximation, some elements of the background were included in the face video object leading to a greater variability in the encoder performance. A parameterized ellipse could have been used for the segmentation mask of the face, but this scenario requires a more complex MPEG-4 profile, hence more computational power.

The present invention provides a system and method for real-time video object creation and encoding based on the MPEG-4 standard. The system has applications in surveillance, security, and mobile videophones. It combines powerful algorithms for object detection, tracking, and compression. The system performance has been demonstrated and discussed on various sequences taken with a fixed camera and with a moving camera. It has been shown that it is possible to obtain very good and relatively constant reconstructed quality for the object of interest even in the conditions of large camera/object movements.

In further embodiments, specific system customizations can improve performance. For example, in the case of mobile videophone applications, the system can learn the face of the specific phone owner for better detection, tracking, and communication. Additionally, the use of log polar mapping, as is known in the art, in conjunction with MPEG-4 compression is an efficient way to decrease the computation complexity of the encoder.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A system for video object generation and selective encoding, comprising:
   a detection module for detecting concurrently a plurality of objects using mean shift in at least one image frame of a series of image frames;
   a tracking module using mean shift for tracking a first object in the plurality of objects in successive image frames of the series of image frames and segmenting the first object from a background, the background being a second object not being part of the plurality of objects; and
   an encoder for encoding the first and second objects to be transmitted to a receiver, the first object is transmitted at a higher quality transmission rate and the second object is transmitted at a lower quality transmission rate.

2. The system of claim 1, further comprising a camera for acquiring the series of image frames.

3. The system of claim 2, further comprising a frame grabber for grabbing image frames from the camera and outputting the image frames to the detection module and tracking module.

4. The system as in claim 2, further comprising a camera control module for controlling a position of the camera to ensure the first object is centered in an image frame.

5. The system as in claim 1, further comprising a modeling module for modeling the first object by computing a statistical characterization of the first object.

6. The system as in claim 1, wherein the receiver merges the first and second object to form a composite image frame.

7. The system as in claim 5, wherein the detection module detects the first object by performing multiple initializations on the at least one image frame, for each initialization computes a degree of similarity between a model and a candidate object in the at least one image frame, and applies an iterative comparative procedure to the degrees of similarity computed, the iterations being based on a gradient vector to shift the location of candidate object in the at least one frame, to derive as the location of the candidate object in the at least one frame that location which has characteristics most similar to the characteristics of the model.

8. The system as in claim 7, wherein the detection module causes the iterations to be repeated until the shift in locations is less than a given first threshold.

9. The system as in claim 8, wherein the detection module uses a mean shift iteration to compute the gradient vector along which the location of the candidate object is shifted.

10. The system as in claim 8, wherein the tracking module computes a degree of similarity between the detected object and a candidate object in a successive frame, and applies an iterative comparative procedure to the degrees of similarity computed, the iterations being based on a gradient vector to shift the location of candidate object in the successive frame, to derive as the location of the candidate object in the successive frame that location which has characteristics most similar to the characteristics of the detected object in the initial frame.

11. The system as in claim 10, wherein the tracking module causes the iterations to be repeated until the shift in locations is less than a given second threshold.

12. The system as in claim 11, wherein the degree of similarity is expressed by a metric derived from the Bhattacharyya coefficient.

13. The system as in claim 1, wherein the encoding module is MPEG-4 compliant.

14. A method for video object generation and selective encoding, the method comprising the steps of:
   detecting concurrently a plurality of objects using mean shift from at least one of a plurality of successive image frames;
   tracking a first object in the plurality of objects using mean shift through the plurality of image frames;
   segmenting the first object from a background of the image frame, the background being a second object not being part of the plurality of objects; and
   encoding the first and second objects to be transmitted to a receiver, wherein the first object is transmitted at a higher quality transmission rate and the second object is transmitted at a lower quality transmission rate.

15. The method as in claim 14, further comprising the step of acquiring the plurality of successive image frames by a camera.

16. The method as in claim 15, further comprising the step of controlling a position of the camera to ensure the first detected object is centered in an image frame.

17. The method as in claim 14, further comprising the step of modeling the first object by computing a statistical characterization of the first object.

18. The method as in claim 14, further comprising the steps of receiving the first compressed object and the second compressed object and decoding the first and second object to form a composite image frame.

19. The method as in claim 17, wherein the detecting step further includes
   performing multiple initializations on the at least one image frame;
   for each initialization, computing a degree of similarity between a model and a candidate object in the at least one image frame; and
   applying an iterative comparative procedure to the degrees of similarity computed, the iterations being based on a gradient vector to shift the location of candidate object in the at least one frame, to derive as the location of the candidate object in the at least one frame that location which has characteristics most similar to the characteristics of the model.

20. The method as in claim 19, further comprising the step of repeating the iterations until the shift in locations is less than a given first threshold.

21. The method as in claim 20, wherein the detection step uses a mean shift iteration to compute the gradient vector along which the location of the candidate object is shifted.

22. The method as in claim 20, wherein the tracking step further includes:
computing a degree of similarity between the detected object and a candidate object in a successive frame; and
applying an iterative comparative procedure to the degrees of similarity computed, the iterations being based on a gradient vector to shift the location of candidate object in the successive frame, to derive as the location of the candidate object in the successive frame that location which has characteristics most similar to the characteristics of the detected object in the initial frame.

23. The method as in claim 22, further comprising the step of repeating the iterations until the shift in locations is less than a given second threshold.

24. The method as in claim 23, wherein the degree of similarity is expressed by a metric derived from the Bhattacharyya coefficient.

25. The method as in claim 14, wherein the segmenting step includes applying a segmentation mask to the first object defining an area to be segmented.

26. The method as in claim 25, wherein the segmentation mask is of a shape resembling the first object.

27. The method as in claim 14, wherein the tracking, segmenting and encoding steps are continuously repeated only for the first object.

28. A program storage device readable by a machine, tangibly embodying a program of instructions executable by the machine to perform method steps for video object generation and selective encoding, the method steps comprising:
detecting concurrently a plurality of objects using mean shift from at least one of a plurality of successive image frames;
tracking a first object in the plurality of objects using mean shift through the plurality of image frames;
segmenting the first object from a background of the image frame, the background being a second object not being part of the plurality of objects; and
encoding the first and second objects to be transmitted to a receiver, wherein the first object is transmitted at a higher quality transmission rate and the second object is transmitted at a lower quality transmission rate.

29. A method for video object generation and selective encoding, the method comprising the steps of:
detecting concurrently a plurality of objects using mean shift from at least one of a plurality of successive image frames;
tracking the plurality of objects using mean shift through the plurality of image frames;
segmenting the plurality of objects from the at least one image frame; and
encoding the plurality of objects to be transmitted to a receiver, wherein each of the plurality of objects is compressed at a different compression rate.

* * * * *